(12) United States Patent
Petrov

(10) Patent No.: US 8,793,182 B2
(45) Date of Patent: Jul. 29, 2014

(54) METHOD OF PROCESSING INVESTMENT DATA AND ASSOCIATED SYSTEM

(75) Inventor: Alexander Serge Petrov, Pittsburgh, PA (US)

(73) Assignee: Access Data Corporation a Broadridge Company, Pittsburgh, PA (US)

( * ) Notice: Subject to any disclaimer, the term of this patent is extended or adjusted under 35 U.S.C. 154(b) by 1500 days.

(21) Appl. No.: 10/944,202

(22) Filed: Sep. 17, 2004

(65) Prior Publication Data

US 2006/0064371 A1 Mar. 23, 2006

(51) Int. Cl.
*G06Q 40/00* (2012.01)

(52) U.S. Cl.
USPC .......................................................... 705/38

(58) Field of Classification Search
None
See application file for complete search history.

(56) References Cited

U.S. PATENT DOCUMENTS

| | | | | |
|---|---|---|---|---|
| 4,722,055 A * | 1/1988 | Roberts | 705/36 R |
| 5,214,579 A | 5/1993 | Wolfberg et al. | |
| 5,583,760 A * | 12/1996 | Klesse | 705/38 |
| 5,749,077 A | 5/1998 | Campbell | |
| 5,864,685 A * | 1/1999 | Hagan | 705/35 |
| 5,893,079 A * | 4/1999 | Cwenar | 705/36 R |
| 6,055,525 A | 4/2000 | Nusbickel | |
| 6,185,567 B1 | 2/2001 | Ratnaraj et al. | |
| 6,470,325 B1 * | 10/2002 | Leemhuis | 705/36 R |
| 6,604,104 B1 | 8/2003 | Smith | |
| 6,947,904 B1 * | 9/2005 | Macey | 705/36 R |
| 7,149,713 B2 | 12/2006 | Bove et al. | |
| 7,165,044 B1 | 1/2007 | Chaffee | |
| 7,184,984 B2 * | 2/2007 | Glodjo et al. | 705/37 |
| 7,197,484 B1 | 3/2007 | Yuyama | |
| 7,321,871 B2 | 1/2008 | Scott et al. | |
| 7,340,427 B1 * | 3/2008 | Cornell | 705/37 |
| 7,707,097 B1 * | 4/2010 | Weiss et al. | 705/37 |
| 2001/0014873 A1 | 8/2001 | Henderson et al. | |
| 2002/0002512 A1 * | 1/2002 | Harpale | 705/26 |
| 2002/0032636 A1 | 3/2002 | Shields et al. | |
| 2002/0069155 A1 | 6/2002 | Nafeh et al. | |
| 2002/0112055 A1 | 8/2002 | Capers et al. | |
| 2002/0133458 A1 * | 9/2002 | Zhou et al. | 705/39 |
| 2002/0138386 A1 | 9/2002 | Maggioncalda et al. | |
| 2002/0143680 A1 | 10/2002 | Walters et al. | |
| 2003/0040999 A1 * | 2/2003 | Hagan | 705/35 |
| 2003/0070003 A1 | 4/2003 | Chong et al. | |
| 2003/0093352 A1 | 5/2003 | Muralidhar et al. | |
| 2003/0167221 A1 | 9/2003 | Kochansky | |
| 2003/0208378 A1 | 11/2003 | Thangaraj et al. | |
| 2003/0208559 A1 | 11/2003 | Velline et al. | |
| 2003/0225663 A1 | 12/2003 | Horan et al. | |

(Continued)

OTHER PUBLICATIONS

Atkins et al.; The Supply and Demand Effect of Block Transactions on Share Prices; Investment Analysts Journal; No. 43; (1996).*

(Continued)

*Primary Examiner* — Virpi Kanervo
(74) *Attorney, Agent, or Firm* — Greenberg Traurig, LLP

(57) ABSTRACT

A computerized method for processing investment data includes providing a server supporting a database for receiving, processing and storing investment data; providing a rules engine for processing rules data employing rules relating to credit assignment; introducing into the server investment data from a plurality of external sources, processing the rules data by the rules engine and permitting user access to the processed and stored investment data. Information regarding customer investments, client information and investment transaction information is provided in the server. A corresponding system is disclosed.

20 Claims, 2 Drawing Sheets

(56) References Cited

U.S. PATENT DOCUMENTS

| | | |
|---|---|---|
| 2004/0039646 A1 | 2/2004 | Hacker |
| 2004/0088195 A1* | 5/2004 | Childress et al. ............... 705/4 |
| 2004/0162772 A1 | 8/2004 | Lewis |
| 2004/0167840 A1* | 8/2004 | Tully et al. .................... 705/35 |
| 2004/0167849 A1* | 8/2004 | Yass et al. ..................... 705/37 |
| 2004/0210501 A1* | 10/2004 | Laskin et al. .................. 705/35 |
| 2004/0215549 A1* | 10/2004 | Madhavan et al. ............. 705/37 |
| 2005/0007249 A1 | 1/2005 | Eryurek et al. |
| 2005/0044035 A1* | 2/2005 | Scott ............................ 705/37 |
| 2005/0060205 A1* | 3/2005 | Woods et al. .................. 705/4 |
| 2005/0102219 A1 | 5/2005 | Taylor et al. |
| 2005/0137969 A1 | 6/2005 | Shah |
| 2005/0182655 A1 | 8/2005 | Merzlak et al. |
| 2006/0064371 A1 | 3/2006 | Petrov |
| 2006/0145892 A1 | 7/2006 | Gueziec |
| 2007/0130043 A1 | 6/2007 | O'Shaughnessy et al. |
| 2007/0174160 A1 | 7/2007 | Solberg et al. |
| 2007/0179890 A1* | 8/2007 | Sandford et al. ............... 705/44 |
| 2007/0192336 A1 | 8/2007 | Iyer et al. |
| 2007/0226027 A1* | 9/2007 | Chang et al. ................... 705/8 |

OTHER PUBLICATIONS

Keim et al.; The Upstairs Market for Large-Block Transactions: Analysis and Measurement of Price Effects; The Review of Financial Studies; vol. 9, No. 1, pp. 1-36; (1996).*

Saar, Gideaon; Price Impact Asymmetry of Block Trades: An Institutional Trading Explanation; Stern School of Business, New York University; (1999).*

New software assists in parameter compliance checicing for fund management firm's clients, LatentZero.com, Jun. 2, 2003.

Gary D. Halbert, "Forecasts & Trends", Mutual Funds—The Blame Game; www.profutures.com; Oct. 28, 2003, pp. 1-5.

Securities and Exchange Commission; Final Rule: Compliance Programs of Investment Companies and Investment Advisers; http://www.sec.gov/rules/final/ia-2204.htm; Aug. 31, 2009; pp. 1-47.

* cited by examiner

US 8,793,182 B2

METHOD OF PROCESSING INVESTMENT DATA AND ASSOCIATED SYSTEM

BACKGROUND OF THE INVENTION

1. Field of the Invention

The present invention relates to an improved method and associated computerized system for providing efficient processing of investment data including transactional data and holdings and more specifically, it relates to such a method and a related system which will facilitate determination of credit assignment for compensation and other purposes and will provide detailed information regarding investment transactions, customers and clients.

2. Description of the Prior Art

It has long been known to employ computers to receive data, process the same within a computer and store the same for retrieval from a database.

In the field of investments, the very high volume of investment transactions and wide range of determinations that need to be made and records provided have led to the recognition that a computerized system for receipt, processing, storing and outputting various types of investment data in various formats would be advantageous. See, for example, U.S. Pat. Nos. 5,749,077 and 5,893,079.

One of the problems that exists in connection with the processing of large volumes of investment transactions and holdings is the monitoring of customer activities and assets and accurate computation of the various segments of the investment community interacting on behalf of a given customer directly or indirectly in a given transaction thereby making the computation of the financial credit or compensation due difficult.

There remains, therefore, a real and substantial need for an effective automated system which can accurately and rapidly process large volumes of investment data received from multiple external sources and apply rules to the same so as to permit determination of credit assignment resulting therefrom.

SUMMARY OF THE INVENTION

The present invention has met the hereinbefore described need.

In a preferred method of the present invention, a server which supports a database is structured to receive, process and store investment data. For simplicity of disclosure herein, the term "server" will be employed to refer to and include a database and/or rules engine supported by the server regardless of whether the database or rules engine is physically a portion of the server or is operatively associated therewith through suitable interaction.

Rules engines are provided in order to facilitate determination of credit assignment from investment data including rules data. Investment data from a plurality of external services is introduced into the server through a suitable interface with user access preferably through the internet being permitted so as to respond to user queries and to deliver the information to a plurality of users in predetermined report form or any other desired logical form or other form. The user interface also permits a data steward to provide input to revise information which will be provided on the host server.

A corresponding computerized system is also provided.

It is an object of the present invention to provide a computerized method and associated system for receiving investment data from a plurality of external sources and receiving, processing and storing the same in a desired format.

It is another object of the present invention to provide such a method wherein investment data for making an accurate credit assignment resulting from investment transactions or asset valuations can be made rapidly and accurately.

It is another object of the present invention which facilitates application of appropriate rules so as to process investment transactions and make accurate credit assignments.

It is a further object of the present invention to provide such automated systems which facilitate simultaneous introduction of data from external nonuser sources into the system and simultaneous access to the system by a plurality of users as well as a data steward, while storing the investment data in the server in desired location and format to facilitate ready review and retrieval as well as credit assignments.

These and other objects of the invention will be more fully understood from the following description of the invention on reference to the illustrations appended hereto.

DESCRIPTION OF THE PREFERRED EMBODIMENTS

Figure 1:
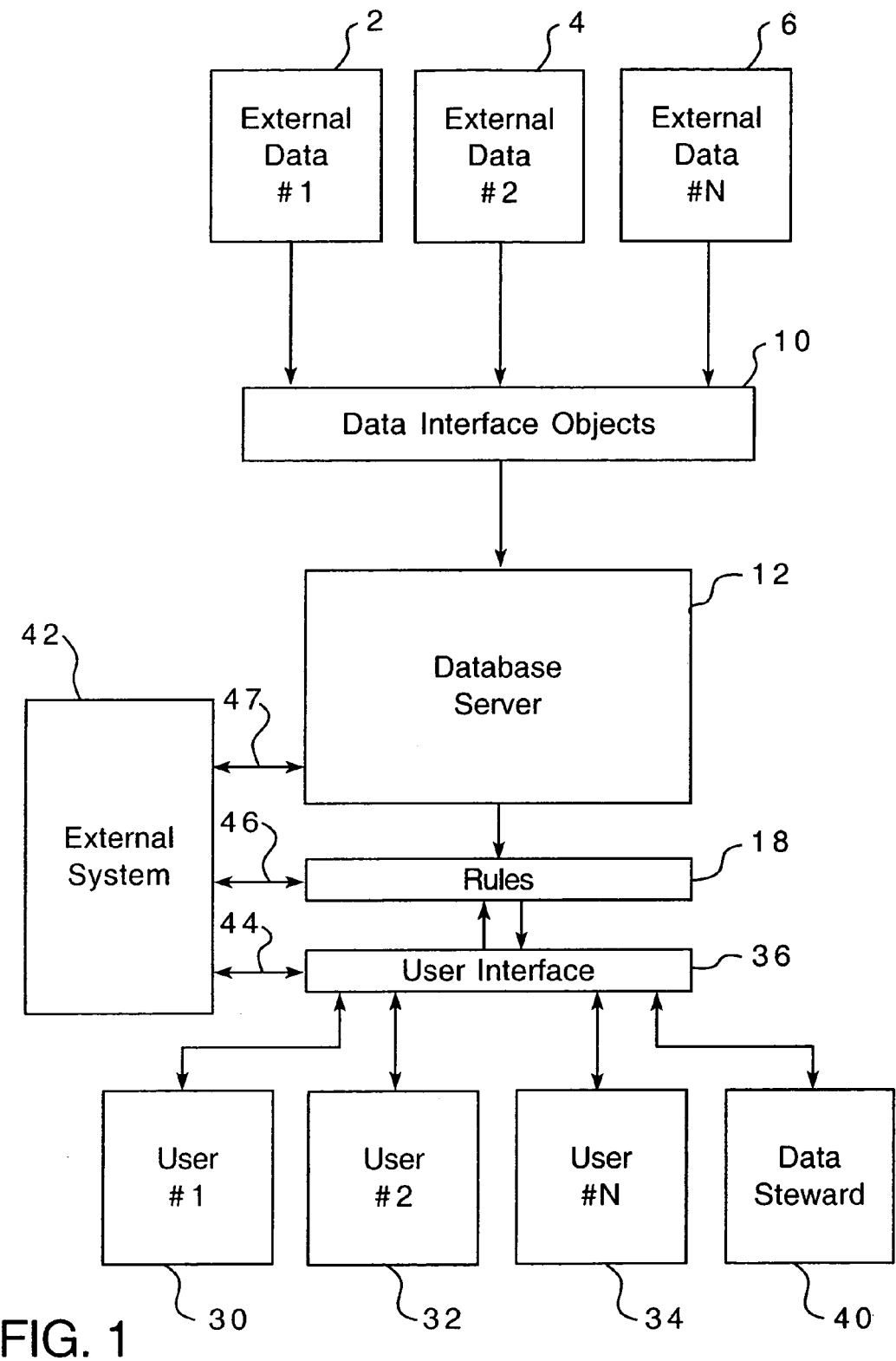
FIG. 1 is a schematic illustration showing a form of system of the present invention structured to facilitate practice of the methods of the present invention.

As employed herein, the term "data object" means an interchangeable software logic component usable with other data objects in a data object interface to perform essentially the same function in different ways.

As employed herein, "data interface object" means a functional interface for conversion of external investment data of different formats into a common format with each data object interface including at least two data objects. The data object interface may be composed of a group of data object interfaces.

As employed herein, the term "investments" shall expressly include, but not be limited to, mutual funds, common and preferred shares of stocks, whether listed on an exchange or not, high-yield corporate bonds and high-grade corporate bonds, municipal bonds, United States Treasury bills, notes and bonds, mortgage-related investments and short-term securities such as commercial paper, bankers acceptances, re-purchase agreements and supporting currencies.

As employed herein, the term "investment data" means data dealing with investments or organizations or individuals who are involved in investments and shall expressly include, but not be limited to, those occupationally involved as well as their customers and clients and shall expressly include information relating to brokers, dealers, clients, main offices, branch offices, addresses, telephone numbers, identify of individuals as well as titles and responsibilities and similar access and identifying information.

As employed herein, the term "credit assignment" means a determination of the individual or entity entitled to credit for a transaction or, entitled to total or partial credit for a transaction or holding involving investments with the determination being made for purposes including but not limited to financial, administrative, personnel, management, compensation, revenue sharing, or statistical purposes and shall expressly include, but not be limited to, assignment of credit for orders, settled trades and investment holdings.

As employed herein "rules data" means data sufficient to permit determination of credit assignment based at least in part on investment data.

As employed herein "rules engine" means rules receiving software that uses rules data received from external sources to determine credit assignment.

It will be appreciated that in making a credit assignment determination so as to make sure that accurate compensation, decisions and payments are made can involve a complex matrix of individuals, organizations and transactional evaluations. For example, one might from a business entity standpoint determine what individual firm, dealer, branch, satellite branch and representative would be entitled to participate in compensation for a transaction. Also, the state, zip code, specific mutual fund, social code, plan or account may enter into the determination, the particular line of business, sales region or territory, product distribution information, external wholesaler and internal wholesaler factors may also need to be considered.

The status of the transaction as to whether it is an order or a settled trade or if it relates to asset holdings may also be involved. Internal rules which govern such transactions must also be considered.

Referring to FIG. 1, a plurality of external sources 2, 4, 6 of investment data which in the form shown have been given #1, #2 through #N may be a plurality of sources of nonuser financial data provided to the system. A suitable interface 10 which is preferably a data interface object of the type disclosed in U.S. patent application Ser. No. 10/878,763 entitled "A Computerized Method of Processing Investment Data and Associated System", the disclosure of which is incorporated herein be reference, is preferably employed.

The investment data is introduced into database server 12 which is programmed to receive, process and store the investment information in desired format and location for suitable retrieval. In applying the standards for automated determination of credit assignments, the data which includes rules data is processed according by rules engine which may be in the form of a separate module or incorporated into the server. A data steward 40 and/or plurality of users 30, 32, 34 which have been identified as #1, #2 through #N may simultaneously access the server 12 through interface 36 and rules 18 to deliver an inquiry and to receive the desired information regarding credit assignment output of the rules engine which may be disposed within the server 12 in a predetermined report form or in another manner.

For example, the desired information in addition to or in lieu of a predetermined report form could be provided in html, xml, pdf files or in other desired form. A data steward 40 also may interact with the server 12 through interface 36 and rules 18 in order to supply rules data to rules engine and review server content and make revisions thereto. The rules 18 may be resident in the database of server 12 as will the investment data which contains rules data which will be processed by the rules engine employing the rules data received in the investment data An advantage of the present invention is that users may access the system through the internet or other means such as an internal network, subject to whatever desired security access restrictions are imposed.

In addition to the users 30, 32, 34 and steward, 40 accessing the server 12 through user interface 36, users 30, 32, 34 and data steward 40, other computer and external systems 42 may access the server 12 directly. Such access may be effected through the internet by other means such as internal network, for example, the users 30, 32, 34, data steward 40 and external system 42 may access the system through user interface 36, rules 18 or database server 12.

As shown in FIG. 1, access by external system 42 may be respectively through paths 44, 46, or 47.

Figure 2:
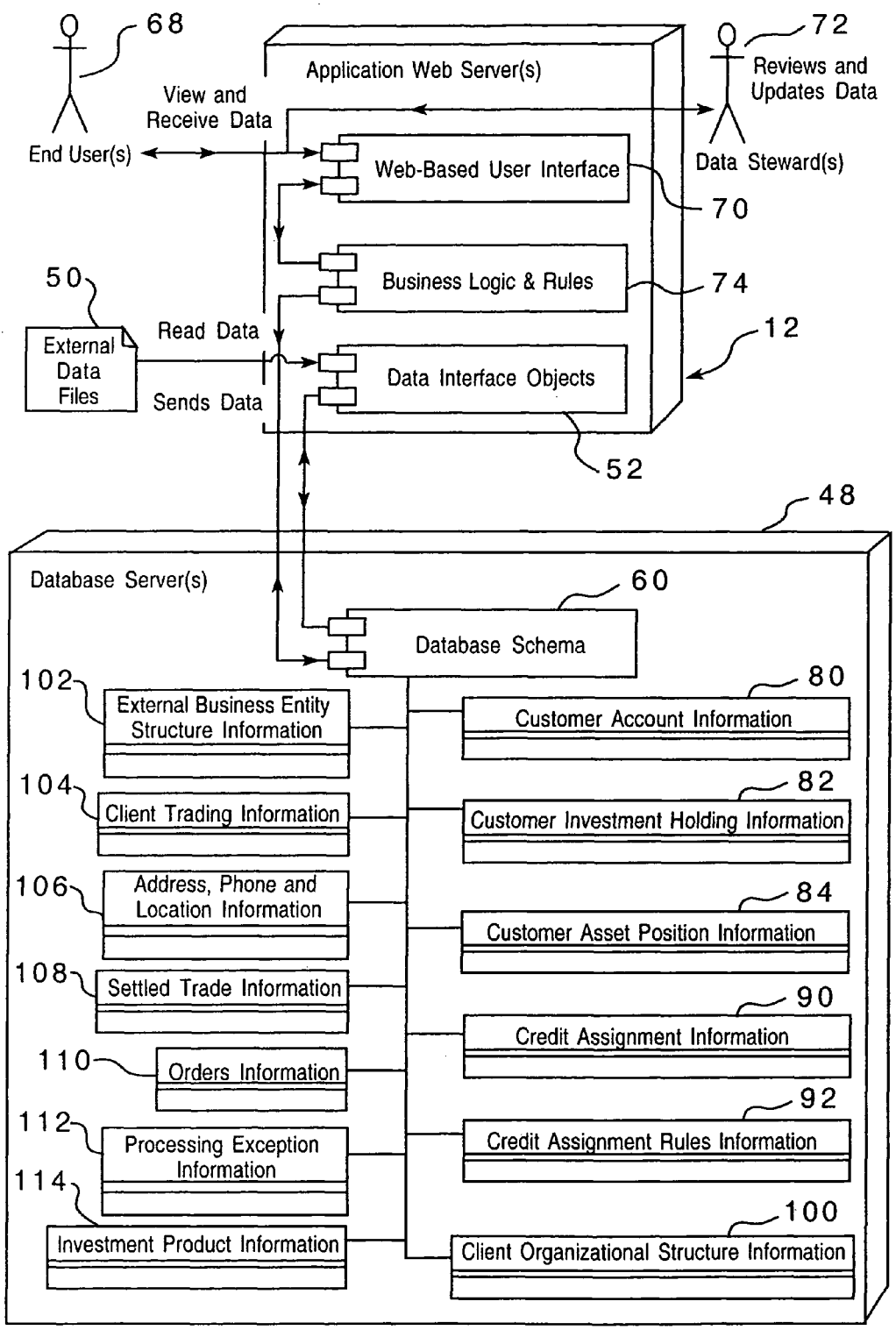
FIG. 2 is an expanded schematic illustration of the system of the present invention which is suitable for use in practicing the method of the present invention.

Referring now to FIG. 2, an expanded schematic view of the method and associated system of the present invention will be considered. In this form for clarity of illustration, the server 12 has been shown as separated from database 48 other than being operatively associated therewith. It will be appreciated that the physical unit may be combined in one housing or be in separate housings which are functionally interconnected. For simplicity of disclosure herein, the server will be regarded as supporting the database and will collectively be referred to as the "server".

FIG. 2 shows the server 12 receiving external investment data 50 through the data interface object 52 which in turn outputs the investment data with or without processing to the database server 48 with the internal database receiving the data from data interface object 52 being identified by the reference number 60. Also shown in FIG. 2, the users 68 access the system through web-based user interface 70 in a bidirectional manner as does the data steward 72. The output of the user interface 70 is received in business logic and rules module 74 for making sure that the data has the form and content desired with the business logic and rules module 74 outputting the investment data to the database 48 for receipt in database module 60.

Also shown within the database 48 wherein the received investment data coming from the external nonuser sources 50, and the user 68 and data steward 72, communications are provided to and from database 60. Shown as being stored for retrieval within the database 60 are customer account information 80, customer investment holding information 82 and customer asset position information 84. Also shown as stored in the desired format and location for ready retrieval are credit assignment information 90, credit assignment rules information 92 and client information. Examples of the client information are the client organizational structure information 100, the external business entity structure information 102, client trading information 104, address, telephone and location information 106, settled trade information 108 and pending order information 110. Also shown are processing exception information 112 which may, for example, consist of new or updated external business entities, client trading information, investment product information added or updated in the database schema 60 by the data interface objects 52 and investment product information 114.

It will be appreciated that the present method and associated apparatus provide efficient, computerized processing of nonuser externally delivered investment data which is received, processed and stored in an organized manner in a server with a plurality of external users being able through the internet to obtain access to the information and a data steward being able to review and revise the same. All of this facilitates employing the desired transaction and asset holding information with the complex credit assignment arrangements to permit rapid accurate determination and reporting of credit due.

Whereas particular embodiments of the invention have been described herein for purposes of illustration, it will be evident to those skilled in the art that numerous variations of the details may be made without departing from the invention as set forth in the appended claims.

The invention claimed is:

1. A computerized method for calculating credit assignment determinations, comprising:

receiving, by a computer, client financial information, wherein the client financial information represents at least 100,000 investment trading transactions associated with at least one client, and wherein the at least one client is distinct from buyers and sellers involved in the at least 100,000 investment trading transactions;

receiving, by the computer, a plurality of credit assignment rules for calculating the credit assignment determinations based, at least in part, on the client financial information, wherein each credit assignment determination is a calculation of a financial credit or compensation due allocation among a plurality of individuals or entities or both that have been associated with the at least one client and each of the at least 100,000 investment trading transactions, wherein the financial credit or compensation due allocation is based, at least in part, on fees paid by at least one of:
(1) the buyers involved in the at least 100,000 investment trading transactions, and
(2) the sellers involved in the at least 100,000 investment trading transactions, and wherein the plurality of credit assignment rules are based, at least in part, on:
(1) characteristics associated with each entity or each individual from the plurality of individuals or entities or both,
(2) a degree of involvement by a particular entity or a particular individual from the plurality of individuals or entities or both in each respective investment trading transaction, and
(3) criteria associated with at least one of the at least 100,000 investment trading transactions;

calculating on daily basis, by the computer, the credit assignment determinations of the at least 100,000 investment trading transactions among the plurality of individuals or entities or both based, at least in part, on the plurality of credit assignment rules and the client financial information; and outputting, by the computer, the calculated credit assignment determinations for the plurality of individuals or entities or both.

2. The computerized method of claim 1, wherein the client financial information is received from a plurality of clients by the server system through data interface objects.

3. The computerized method of claim 1, wherein the plurality of credit assignment rules are further selected from the group of: (i) financial rules, (ii) administrative rules, (iii) personnel rules, (iv) management rules, (v) compensation rules, (vi) revenue sharing rules, and (vii) statistical analysis rules.

4. The computerized method of claim 1, wherein the client financial information further comprises data regarding investment asset positions.

5. The computerized method of claim 1, wherein the at least 100,000 investment trading transactions comprise at least one of: (i) a first plurality of settled trades regarding at least one mutual fund, and (ii) a second plurality of trading orders regarding the at least one mutual fund.

6. The computerized method of claim 1, wherein at least one characteristic of the each individual is a corporate position of such individual.

7. The computerized method of claim 1, wherein at least one characteristic of the each entity is a corporate structure of such entity.

8. The computerized method of claim 1, wherein the at least one client is an entity from the plurality of entities for which the credit assignment determinations are calculated.

9. The computerized method of claim 1, wherein at least one seller of the sellers is a mutual fund.

10. The computerized method of claim 1, wherein at least one buyer of the buyers is a mutual fund.

11. A computer system for calculating credit assignment determinations, comprising:
at least one computer, comprising:
a memory having at least one region for storing particular computer executable program code; and
at least one processor configured to execute the particular program code stored in the memory, wherein when the processor executes the particular program code, the at least one computer is configured to perform at least the following operations:
receiving client financial information, wherein the client financial information represents at least 100,000 investment trading transactions associated with at least one client, and wherein the at least one client is distinct from buyers and sellers involved in the at least 100,000 investment trading transactions;
receiving a plurality of credit assignment rules for calculating credit assignment determinations based, at least in part, on the client financial information,
wherein each credit assignment determination is a calculation of a financial credit or compensation due allocation among a plurality of individuals or entities or both that have been associated with the at least one client and each of the at least 100,000 investment trading transactions,
wherein the financial credit or compensation due allocation is based, at least in part, on fees paid by at least one of:
(1) the buyers involved in the at least 100,000 investment trading transactions, and
(2) the sellers involved in the at least 100,000 investment trading transactions, and
wherein the plurality of credit assignment rules are based, at least in part, on:
(1) characteristics associated with each entity or each individual from the plurality of individuals or entities or both,
(2) a degree of involvement by a particular entity or a particular individual from the plurality of individuals or entities or both in each respective investment trading transaction, and
(3) criteria associated with at least one of the at least 100,000 investment trading transactions;
calculating, on daily basis the credit assignment determinations of the at least 100,000 investment trading transactions among the plurality of individuals or entities or both based, at least in part, on the plurality of credit assignment rules and the client financial information; and
outputting, the calculated credit assignment determinations for the plurality of individuals or entities or both.

12. The computer system of claim 11, wherein the client financial information is received from a plurality of clients through data interface objects.

13. The computer system of claim 11, wherein the plurality of credit assignment rules are further selected from the group of: (i) financial rules, (ii) administrative rules, (iii) personnel rules, (iv) management rules, (v) compensation rules, (vi) revenue sharing rules, and (vii) statistical analysis rules.

14. The computer system of claim 11, wherein the at least 100,000 investment trading transactions comprise at least one of: (i) a first plurality of settled trades regarding at least one mutual fund, and (ii) a second plurality of trading orders regarding the at least one mutual fund.

15. The computer system of claim 11, wherein the client financial information is received from a plurality of clients.

16. The computer system of claim 11, wherein at least one characteristic of the each individual is a corporate position of such individual.

17. The computer system of claim 11, wherein at least one characteristic of the each entity is a corporate structure of such entity.

18. The computer system of claim 11, wherein the at least one client is an entity from the plurality of entities for which the credit assignment determinations are calculated.

19. The computer system of claim 11, wherein at least one seller of the sellers is a mutual fund.

20. The computer system of claim 11, wherein at least one buyer of the buyers is a mutual fund.

\* \* \* \* \*